(12) United States Patent
Walston et al.

(10) Patent No.: US 8,386,643 B2
(45) Date of Patent: Feb. 26, 2013

(54) AUTOMATED DOUBLE FIRMWARE UPGRADE

(75) Inventors: Allen Walston, Sandy Springs, GA (US); Jose Barroso, Alpharetta, GA (US); David Bassett, Flowery Branch, GA (US)

(73) Assignee: ARRIS Group, Inc., Suwanee, GA (US)

( * ) Notice: Subject to any disclaimer, the term of this patent is extended or adjusted under 35 U.S.C. 154(b) by 462 days.

(21) Appl. No.: 12/419,262

(22) Filed: Apr. 6, 2009

(65) Prior Publication Data

US 2009/0282134 A1    Nov. 12, 2009

Related U.S. Application Data

(60) Provisional application No. 61/042,467, filed on Apr. 4, 2008, provisional application No. 61/073,651, filed on Jun. 18, 2008.

(51) Int. Cl.
*G06F 15/16* (2006.01)

(52) U.S. Cl. ......... 709/245; 709/201; 709/240; 709/242
(58) Field of Classification Search ............... 709/201, 709/245
See application file for complete search history.

(56) References Cited

U.S. PATENT DOCUMENTS

| | | | | |
|---|---|---|---|---|
| 5,499,357 A | * | 3/1996 | Sonty et al. | 710/104 |
| 2004/0059802 A1 | * | 3/2004 | Jacquemot et al. | 709/220 |
| 2004/0123091 A1 | * | 6/2004 | Das | 713/2 |
| 2005/0034115 A1 | * | 2/2005 | Carter et al. | 717/173 |
| 2007/0239841 A1 | * | 10/2007 | Lehrman | 709/217 |

* cited by examiner

*Primary Examiner* — Djenane Bayard
(74) *Attorney, Agent, or Firm* — Troy A. Van Aacken; Robert J. Starr

(57) ABSTRACT

A method of upgrading the software load of a device includes receiving a configuration file and checking if a device software load matches load information (EE) of the configuration file. If the device software load does not match the EE of the configuration file, a check is made to determine if the device software load matches new load information (NE) of the configuration file.

12 Claims, 4 Drawing Sheets

AUTOMATED DOUBLE FIRMWARE UPGRADE

PRIORITY CLAIM

This application claims priority under 35 USC 119 to USA application No. 61/042,467 filed on Apr. 4, 2008, which is incorporated herein by reference in its entirety. This application also claims priority under 35 USC 119 to USA application No. 61/073,651 filed on Jun. 18, 2008, which is incorporated herein by reference in its entirety.

BACKGROUND

In some situations it becomes complicated to upgrade the software loads (e.g. operating software) of devices deployed in the field. In some cases, one or more interim loads must first be installed be the devices, before a final load will be accepted and installed. In prior techniques this has required manual action to first get the interim load(s) installed, before upgrading to the final desired load. This is particularly a problem when customers have units in inventory which are running especially old loads.

One prior art solution to this problem is to manually upgrade the affected devices to an interim load so that they can then accept the desired load, which is specified in a configuration file which the devices receive via a network. This requires either coordination between installers and personnel responsible for deploying the new loads, or it requires scripts to run every night looking for devices that need to receive an interim load. In the latter case, the installer may leave the device facility without being able to verify full operation of the device.

A prior art process for provisioning a modem or other devices with a software load is illustrated in FIG. 2. The process begins 202 and a modem receives a configuration file 204. This configuration file may come from, for example, a provisioning server 104 communicating over an HFC (Hybrid Fiber Coax) network 150 facilitated by a CMTS (Cable Modem Termination System) 106. If there is software load information in the configuration file 206, a check is done to determine if the current load of the device matches the load information in the configuration file 208. If it does, then the process concludes. If not, an upgrade to a new load is performed 210. The device resets 212 to activate the new software load, and the process concludes 214.

BRIEF DESCRIPTION OF THE DRAWINGS

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

Figure 2:
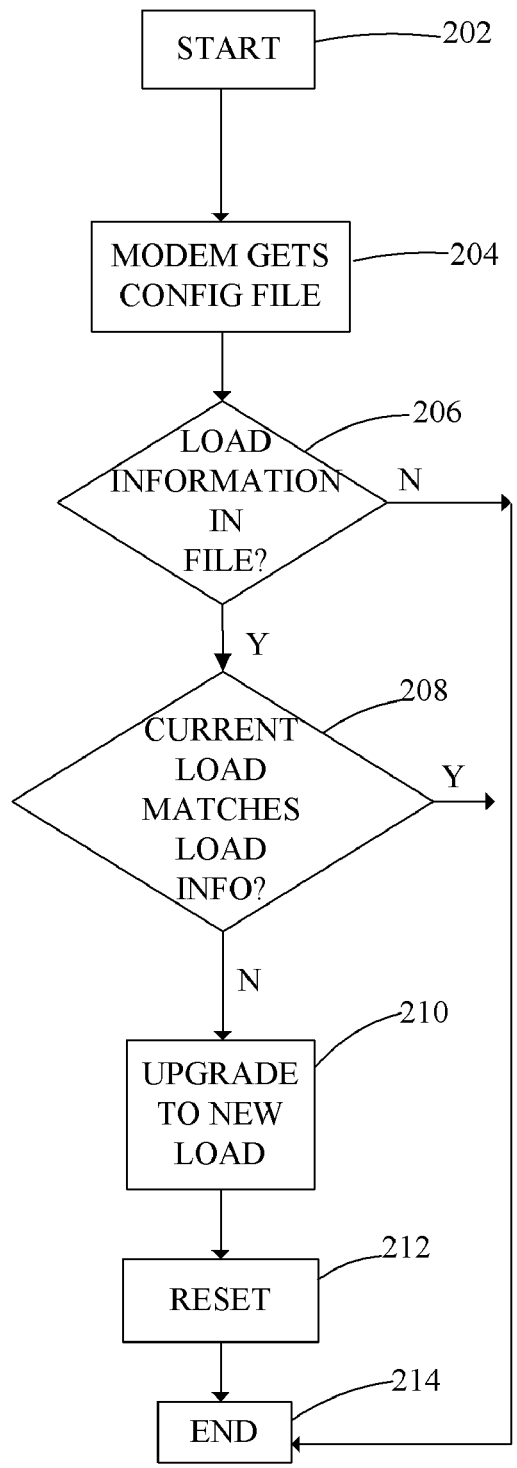

A prior art process for provisioning a modem or other devices with a software load is illustrated in FIG. 2.

Figure 3:
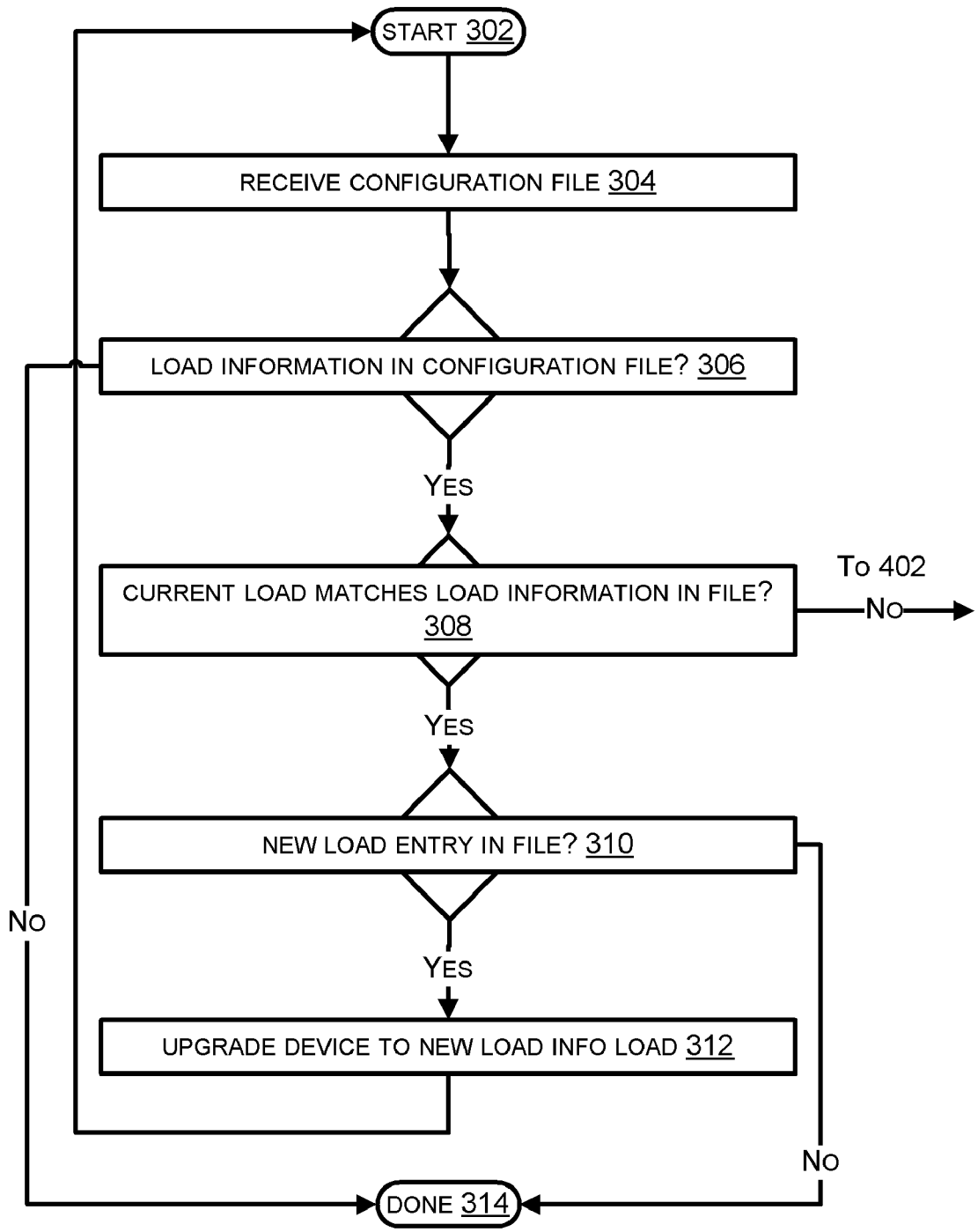

FIG. 3 is a flow chart of an embodiment of a process to provision a device with a software load.

Figure 4:
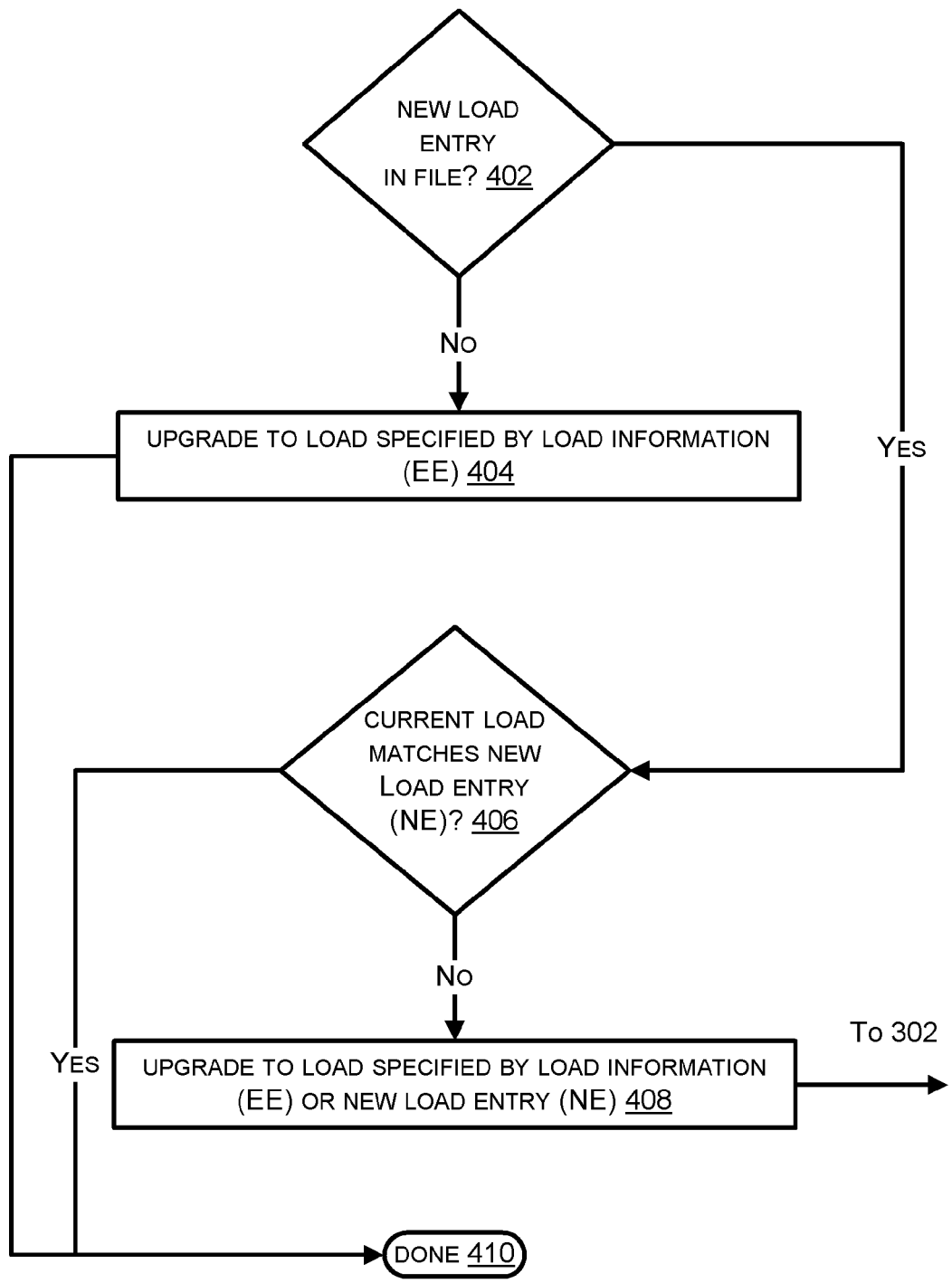

FIG. 4 is a flow chart of an embodiment of a process of provisioning a device with a software load.

DETAILED DESCRIPTION

References to "one embodiment" or "an embodiment" do not necessarily refer to the same embodiment, although they may.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list.

"Logic" refers to signals and/or information that may be applied to influence the operation of a device. Software, hardware, and firmware are examples of logic. Hardware logic may be embodied in circuits. In general, logic may comprise combinations of software, hardware, and/or firmware.

Those skilled in the art will appreciate that logic may be distributed throughout one or more devices, and/or may be comprised of combinations of instructions in memory, processing capability, circuits, and so on. Therefore, in the interest of clarity and correctness logic may not always be distinctly illustrated in drawings of devices and systems, although it is inherently present therein.

The techniques and procedures described herein may be implemented via logic distributed in one or more computing devices. The particular distribution and choice of logic is a design decision that will vary according to implementation.

Described herein are embodiments of a process and system to provide 'double pump' software load upgrades to a device using a single configuration file. In fact, although described at times in terms of a double upgrade process, the techniques described herein may be applied to perform any number of intermediate and final software upgrades for a device, not merely two.

Figure 1:
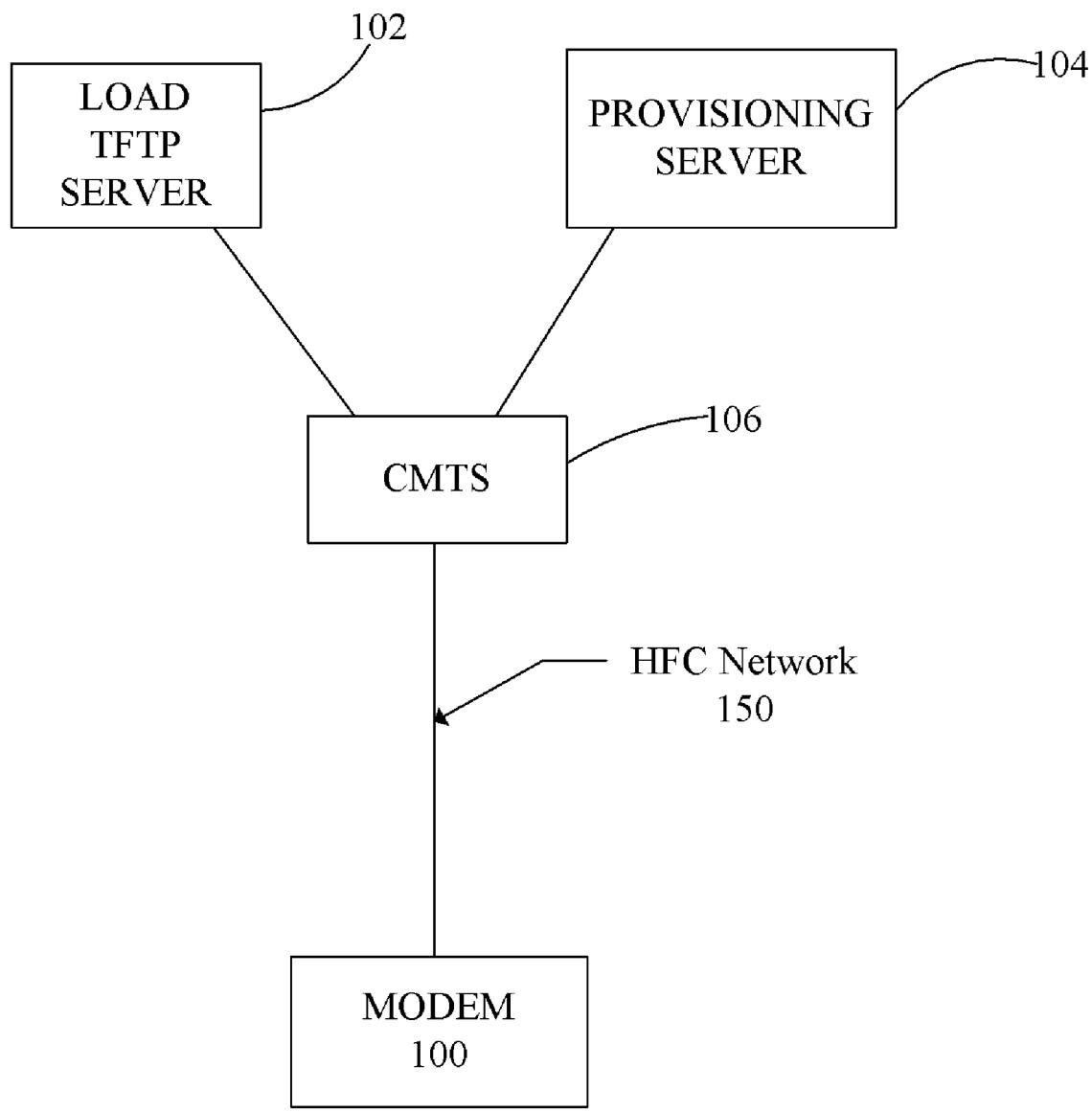
FIG. 1 is a block diagram of an embodiment of an environment in which one or more aspects of the present invention may be deployed.

FIG. 1 is a block diagram of an embodiment of an environment in which one or more aspects of the present invention may be deployed. One or more cable modems 100 are coupled via an HFC (Hybrid Fiber Coax) network 150 to upstream network components. One such upstream component is a Cable Modem Termination System (CMTS) 106. In practice, there may be many CMTS devices 106 servicing many modems 100 in a typical HFC network 150. HFC networks are commonly found in cable television deployments involving both optical communication components and radio frequency (RF) components.

The CMTS 106 provides data communication capability to the modems 100 from and over the HFC network 115. The data communication facility provided by the CMTS 106 may also be employed to provision the modems 100, for example, with software loads (e.g. operating software). The CMTS 106 may coordinate with provisioning server 104 to communicate to the modems 100 configuration and provisioning information, such as software load version information. The CMTS 106 may coordinate with provisioning server 104 to communicate to the modems 100 other provisioning information such as DOCSIS (Data Over Cable Service Interface Specification) upstream and downstream channel mapping. The CMTS 106 may further communicate with a load server 102 to communicate to the modems 100 software loads in manners in accordance with the principles described herein.

In one embodiment, a configuration file is provided comprising Management Information Base (MIB) data objects, possibly including an Enhanced Firmware Loading MIB (i.e. 'NE). Older/existing loads software loads running on devices will not recognize and therefore will ignore the Enhanced Firmware Loading MIB. These older loads will only respond to the currently defined MIB entry (the 'load information', i.e. 'EE') and will therefore upgrade to the load specified by the load information. The load specified in the currently defined MIB entry will respond to the Enhanced Firmware Loading MIB (the 'new load information' NE). The device load installs the load specified with the load information EE; this load, in turn, examines and responds to the Enhanced Firmware Loading MIB (NE) and makes an intelligent decision on whether an additional upgrade is needed based on its current load and the specified new load information.

One embodiment of a process in accordance with these principles is illustrated by the following 'pseudocode'. In the following pseudocode description, EE (existing entry) refers to the load information that all devices will respond to. NE (new entry) refers to the new load information that only some devices (e.g. with newer loads installed) will respond to. Note that the device may comprise the logic to carry out the acts of this iterative upgrade process, and/or one or more network components may comprise some or all of the needed logic.

```
boot device and examine EE for software load information
determine if current device load matches EE
look for NE
if ((current load == EE) && (no NE present))
done
else if ((current load == EE) && (NE present))
upgrade device to NE
else if((current load != EE) && (no NE present))
upgrade device to EE
else // current load != EE && NE present
{
if( current load == NE )
exit
else
upgrade device to EE and repeat the process
}
```

The configuration file using upstream network logic to include software load information (EE) that older software loads of downstream devices will respond to, and further including software load information (NE) that only newer software loads of downstream devices will respond to. Sometimes the NE and/or EE information will not be included in the configuration file at all. The configuration file may be communicated to at least one downstream network device (e.g. during device initialization). The upstream network equipment may receive a request from the downstream device for the EE software load, and may communicate the EE software load to the downstream device. Alternatively, or additionally, the upstream network equipment may receive a request from the downstream device for the NE software load, and may communicate the NE software load to the downstream device.

The configuration file may be formed with management information base (MIB) entries for the EE and the NE. It may be communicated, in some embodiments, over a hybrid fiber coax (HFC) network using data over cable service interface specification (DOCSIS). In some embodiments, the EE software load and the NE software load may be communicated from a load server, the load server separate from a provisioning server that communicates the configuration file to the downstream device. In other embodiments, the load server and provisioning server may be the same device or collection of devices.

The downstream device (or another device, but typically the downstream device itself) may receive the configuration file and check if its software load matches load information (EE) of the configuration file. If the device software load does not match the EE of the configuration file, the device may check if its software load matches new load information (NE) of the configuration file. If the device software load does not match the NE of the configuration file, the device may retrieve via the network, and install, a new load as described by the EE of the configuration file. The device may then retrieve another configuration file and repeat the process (e.g. it may 'double-pump' its software load).

If there is no NE in the configuration file, and the device software load does not match the EE, the device may retrieve and install a software load as described by the EE. If the device software load matches the EE, and there is an NE entry in the configuration file, the device may retrieve and install a software load as described by the NE, and then it retrieving another configuration file (e.g. it may 'double-pump' its software load).

FIG. 3 is a flow chart of an embodiment of a process to provision a device with a software load. The process begins 302 and a modem or other device receives a configuration file 304. If there is software load information in the configuration file 306, a check is made 308 to see if the current software load of the device matches the load described in the configuration file (the EE). If there is a match, then a further check is made 310 to see if there is a new load entry NE in the configuration file. If not, the process concludes 314. If so, the new load is obtained and installed by the device 312. The process then does not conclude but rather returns the starting point 302 at which point it repeats until such time that one of the terminating conditions applies.

FIG. 4 is a flow chart of an embodiment of a process of provisioning a device with a software load. This process may take place in conjunction with the process embodiment described in FIG. 3 in the event of the current load of the device does not match load information in the configuration file. If there is a new load entry in the configuration file 402, a check is made 406 to determine if the current load of the device matches the load described in the new load entry. If it matches, the process concludes at 410. If not, an upgrade is made by the device 408 to incorporate the new software load. Then, rather than concluding the process, the process repeats, returning to the starting point 302 referenced in FIG. 3. If at 402 there is not a new load entry in the configuration file, the device upgrades to the load information (regular load information, not new load information) in the configuration file 404, and the process concludes at 410.

Following a process in accordance with the embodiments of FIGS. 3 and 4, a device may iteratively upgrade its software load. Provisioning a software load may include, when necessary, provisioning intermediate loads which are prerequisites to subsequent and final loads that the device may ultimately provision. This process may occur automatically, saving considerable cost, time, and complexity over prior techniques.

Those having skill in the art will appreciate that there are various logic implementations by which processes and/or systems described herein can be effected (e.g., hardware, software, and/or firmware), and that the preferred vehicle will vary with the context in which the processes are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

What is claimed is:

1. A method comprising:
   forming a configuration file using upstream network logic, the configuration file comprising software load information (EE) that older software loads of downstream devices will respond to, and further comprising software load information (NE) that only newer software loads of downstream devices will respond to;
   communicating the configuration file to at least one downstream network device that does not comprise logic to examine and respond to the NE;
   receiving a request from the downstream device for the EE software load;
   communicating the EE software load to the downstream device, the EE software load comprising logic to examine and respond to the NE;
   receiving a request from the downstream device for the NE software load; and
   communicating the NE software load to the downstream device.

2. The method of claim 1, wherein the forming a configuration file using upstream network logic further comprises:
   forming the configuration file with management information base (MB) entries for the EE and the NE.

3. The method of claim 1, wherein the communicating the configuration file to at least one downstream network device further comprises:
   communicating the configuration file over a hybrid fiber coax (HFC) network using data over cable service interface specification (DOCSIS).

4. The method of claim 1, wherein the communicating the configuration file to at least one downstream network device further comprises:
   communicating the configuration file from a provisioning server.

5. The method of claim 1, wherein the communicating the EE software load to the downstream device further comprises:
   communicating the EE software load and the NE software load from a load server, the load server separate from a provisioning server that communicates the configuration file to the downstream device.

6. The method of claim 1, wherein the communicating the EE software load to the downstream device further comprises:

communicating the EE software load and the NE software load from a load server, the load server also a provisioning server that communicates the configuration file to the downstream device.

7. A system comprising:

machine memory or circuits comprising upstream network logic adapted to form a configuration file comprising software load information (EE) that older software loads of downstream devices will respond to, and further comprising software load information (NE) that only newer software loads of downstream devices will respond to;

machine memory or circuits comprising upstream network logic to communicate the configuration file to at least one downstream network device that does not comprise logic to examine and respond to the NE;

machine memory or circuits comprising upstream network logic to receive a request from the downstream device for the EE software load;

machine memory or circuits comprising upstream network logic to communicate the EE software load to the downstream device, the EE software load comprising logic to examine and respond to the NE;

machine memory or circuits comprising upstream network logic to receive a request from the downstream device for the NE software load; and upstream network logic to communicate the NE software load to the downstream device.

8. The system of claim 7, wherein forming a configuration file using upstream network logic further comprises:
the upstream network logic forming the configuration file with management information base (MIB) entries for the EE and the NE.

9. The system of claim 7, wherein communicating the configuration file to at least one downstream network device further comprises:
the upstream network logic communicating the configuration file over a hybrid fiber coax (HFC) network using data over cable service interface specification (DOCSIS).

10. The system of claim 7, wherein communicating the configuration file to at least one downstream network device further comprises:
the upstream network logic communicating the configuration file from a provisioning server.

11. The system of claim 7, wherein communicating the EE software load to the downstream device further comprises:
the upstream network logic communicating the EE software load and the NE software load from a load server, the load server separate from a provisioning server that communicates the configuration file to the downstream device.

12. The system of claim 7, wherein communicating the EE software load to the downstream device further comprises:
the upstream network logic communicating the EE software load and the NE software load from a load server, the load server also a provisioning server that communicates the configuration file to the downstream device.

* * * * *